United States Patent
Heller

(10) Patent No.: US 9,695,923 B2
(45) Date of Patent: Jul. 4, 2017

(54) POWER TRANSMITTING COMPONENT WITH PINION FLANGE FIXED TO PINION

(71) Applicant: American Axle & Manufacturing, Inc., Detroit, MI (US)

(72) Inventor: Enrico Heller, Detroit, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 346 days.

(21) Appl. No.: 14/629,765

(22) Filed: Feb. 24, 2015

(65) Prior Publication Data

US 2016/0245385 A1    Aug. 25, 2016

(51) Int. Cl.
*F16H 48/42* (2012.01)
*F16H 55/17* (2006.01)
*F16H 57/00* (2012.01)

(52) U.S. Cl.
CPC ......... *F16H 48/42* (2013.01); *F16H 57/0018* (2013.01); *F16H 2048/423* (2013.01)

(58) Field of Classification Search
CPC ...................... F16H 2048/423; F16H 2048/426
See application file for complete search history.

(56) References Cited

U.S. PATENT DOCUMENTS

| | | | | |
|---|---|---|---|---|
| 2,135,477 A | * | 11/1938 | Griswold | F16C 19/56 184/6.12 |
| 2003/0152303 A1 | * | 8/2003 | Wickens | F16C 19/548 384/563 |
| 2004/0177509 A1 | * | 9/2004 | Russell | F16C 19/364 29/898.062 |
| 2006/0094552 A1 | | 5/2006 | Duncan | |
| 2007/0155578 A1 | | 7/2007 | Petruska et al. | |
| 2008/0166082 A1 | * | 7/2008 | Hofmann | F16C 19/38 384/613 |
| 2008/0305910 A1 | | 12/2008 | Brasile et al. | |
| 2009/0036223 A1 | | 2/2009 | Stambek et al. | |
| 2009/0054163 A1 | | 2/2009 | Gerding et al. | |
| 2014/0105680 A1 | * | 4/2014 | Schnebele | F16D 1/04 403/359.5 |
| 2014/0302961 A1 | | 10/2014 | Downs et al. | |

* cited by examiner

*Primary Examiner* — Terence Boes

(74) *Attorney, Agent, or Firm* — Harness, Dickey & Pierce, P.L.C.

(57) ABSTRACT

A power transmitting component with a housing, a pinion rotatably disposed in the housing, a flange and a retainer. The pinion has a stem that defines male threads and a plurality of first teeth that intersect the male threads. The flange has an internal aperture that defines female threads, a plurality of second teeth. The female threads are threadably engaged with the male threads. The retainer is insert molded between the stem and the flange and includes a body, a plurality of third teeth, a plurality of fourth teeth and a retainer member. The third teeth extend from the body and engage the first teeth. The fourth teeth extend from the body and engage the second teeth. The retainer member is engaged to one of the flange and the stem. A method for coupling a flange to a stem is also provided.

15 Claims, 4 Drawing Sheets

POWER TRANSMITTING COMPONENT WITH PINION FLANGE FIXED TO PINION

FIELD

The present disclosure relates to a power transmitting component with a pinion flanged fixed to a pinion.

BACKGROUND

This section provides background information related to the present disclosure which is not necessarily prior art.

The mounting of a propshaft flange to pinion of a power transmitting component, such as a rear axle assembly, can involve the tightening of a nut to the flange to secure the flange to a stem or shaft of the pinion, as well as the assembly of a device to the pinion, such as an external snap ring, that limits rotation of the nut in a loosening direction. While such configuration is well suited for its intended purpose, we have noted certain drawbacks, including a relatively high part count and the common practice of selecting a thickness of the snap ring to match the dimensions of a particular assembly (to thereby accommodate stack-up tolerance). Moreover, certain functions associated with such configuration are difficult to fully automate. Accordingly, there remains a need in the art for a power transmitting component having an improved system for coupling a pinion flange to a pinion.

SUMMARY

This section provides a general summary of the disclosure, and is not a comprehensive disclosure of its full scope or all of its features.

In one form, the present teachings provide a power transmitting component having a housing, a pinion, a flange and a retainer. The pinion is rotatably disposed in the housing and has a pinion stem that defines a male threaded segment and a plurality of first teeth. The plurality of first teeth intersect the male threaded segment. The flange has an internal aperture that defines a female threaded segment, a plurality of second teeth. The female threaded segment is threadably engaged with the male threaded segment. The retainer is insert molded between the pinion stem and the flange and includes a retainer body, a plurality of third teeth, a plurality of fourth teeth and a first axial retaining member. The third teeth extend from the retainer body and engage the first teeth. The fourth teeth extend from the retainer body and engage the second teeth. The first axial retaining member is engaged to one of the flange and the pinion stem.

In another form, the present teachings provide a method for coupling a flange to a pinion stem of a pinion. The method includes: threading the flange to the pinion stem; and injecting a plastic material between the flange and the pinion stem, the plastic material hardening to form a retainer that inhibits rotation of the flange relative to the pinion stem, the retainer being configured to carry all load that is transmitted between the flange and the pinion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
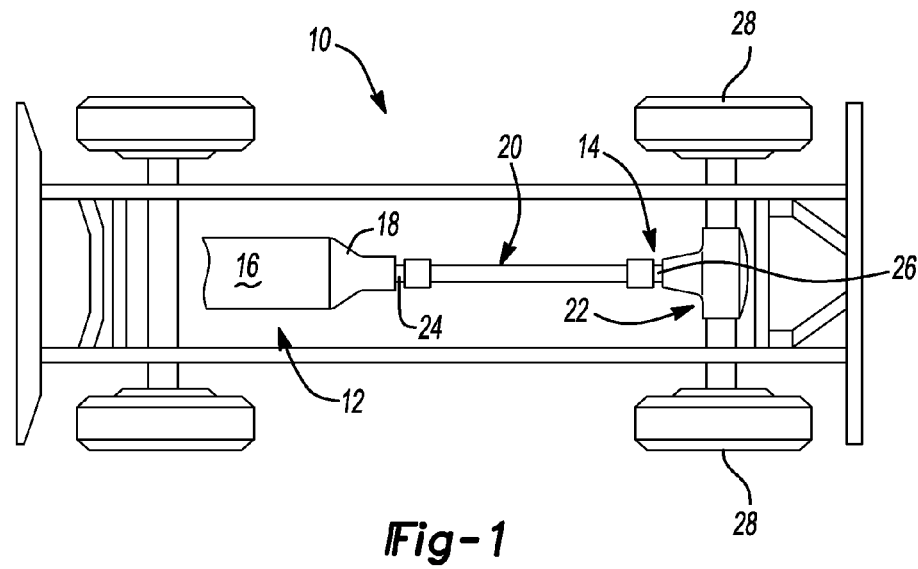
FIG. 1 is a schematic illustration of an exemplary vehicle having an drive train component constructed in accordance with the teachings of the present disclosure.

With reference to FIG. 1 of the drawings, a vehicle having an axle assembly that is constructed in accordance with the teachings of the present disclosure is generally indicated by reference numeral 10. The vehicle 10 can have a powertrain 12 and a drivetrain 14. The powertrain 12 can include a source of rotary power, such as an internal combustion engine 16, and a transmission 18. The drivetrain 14 can be configured to transmit rotary power between the powertrain 12 and one or more sets of vehicle wheels. In the particular example provided, the drivetrain 14 has a rear wheel drive configuration that includes a propeller shaft 20 and a rear axle assembly 22. The propeller shaft 20 is configured to transmit rotary power between an output member 24 of the transmission 18 and a pinion 26 of the rear axle assembly 22. The rear axle assembly 22 is configured to transmit rotary power from the pinion 26 to a pair of rear wheels 28.

A portion of the vehicle 10 can be characterized as being a power transmitting component having a pinion to which a flange is coupled. In the example provided, the rear axle assembly 22 is an example of such a power transmitting component, but it will be appreciated that the teachings of the present disclosure have application to other types of power transmitting components, including transfer cases, power take-off units, clutch couplings, viscous coupling and center differentials, and can be employed in any type of drivetrain, including those having four-wheel drive, all-wheel drive, and front-wheel drive configurations.

Figure 2:
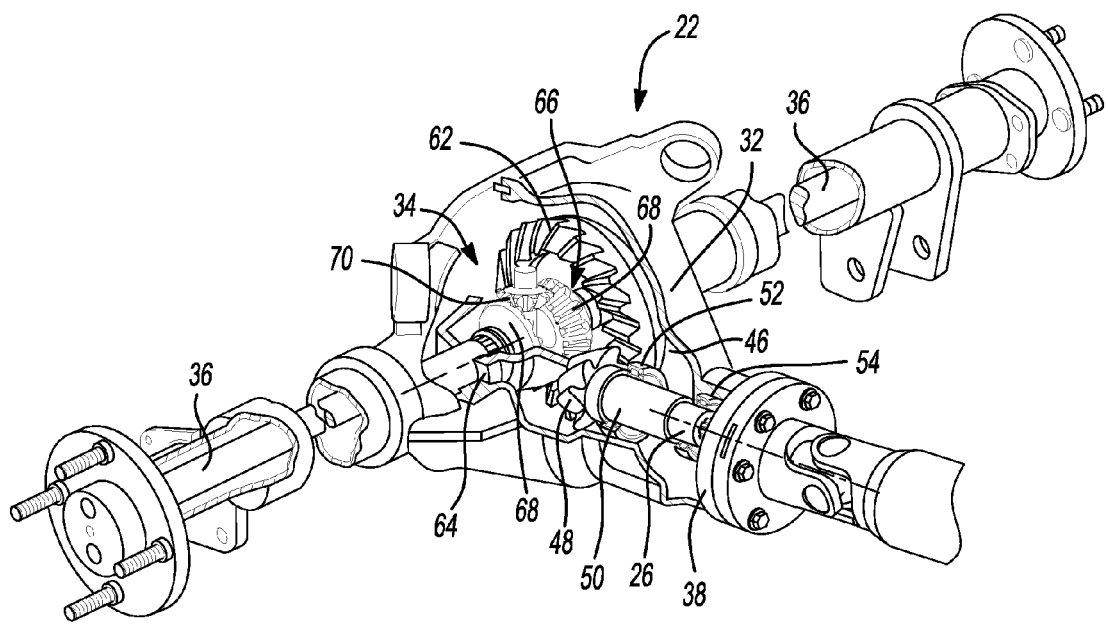
FIG. 2 is a partially cut away perspective view of a portion of the vehicle of FIG. 1, illustrating the drive train component in more detail.

With reference to FIG. 2, the rear axle assembly 22 can include a housing 32, a differential assembly 34, a pair of axle shafts 36, a flange 38 and a retainer 40 (FIG. 4) in addition to the pinion 26. The housing 32 can define a cavity 46 into which the pinion 26, the differential assembly 34 and the axle shafts 36 are received. The pinion 26 include a pinion gear 48 and a pinion stem 50 that are fixedly coupled to one another for common rotation. The pinion 26 can be supported for rotation relative to the housing 32 by a head bearing 52 and a tail bearing 54 that can be mounted on the pinion stem 50. The tail bearing 54 and optionally the head bearing can be a bearing that is configured to handle axial thrust loads, such as an angular contact bearing and/or a tapered roller bearing. In the particular example provided, each of the head and tail bearings 52 and 54 is a tapered roller bearing and is configured to handle thrust loads exerted onto the pinion 26 in a predetermined direction. The differential assembly 34 can include a ring gear 62, which can be meshingly engaged with the pinion gear 48, and a means for transmitting rotary power between the ring gear 62 and the axle shafts 36. In the particular example provided, the rotary power transmitting means comprises a differential case 64, which is coupled to the ring gear 62 for common rotation, and a conventional differential gearset 66 which is housed in the differential case 64 and has bevel side gears 68, which are non-rotatably coupled to the axle shafts 36, and bevel pinions 70 that are rotatably mounted to the differential case 64 and meshingly engaged to bevel side gears 68. It will be appreciated, however, that other types of devices can be used instead of the differential gearset 66, including one or more clutches.

Figure 3:
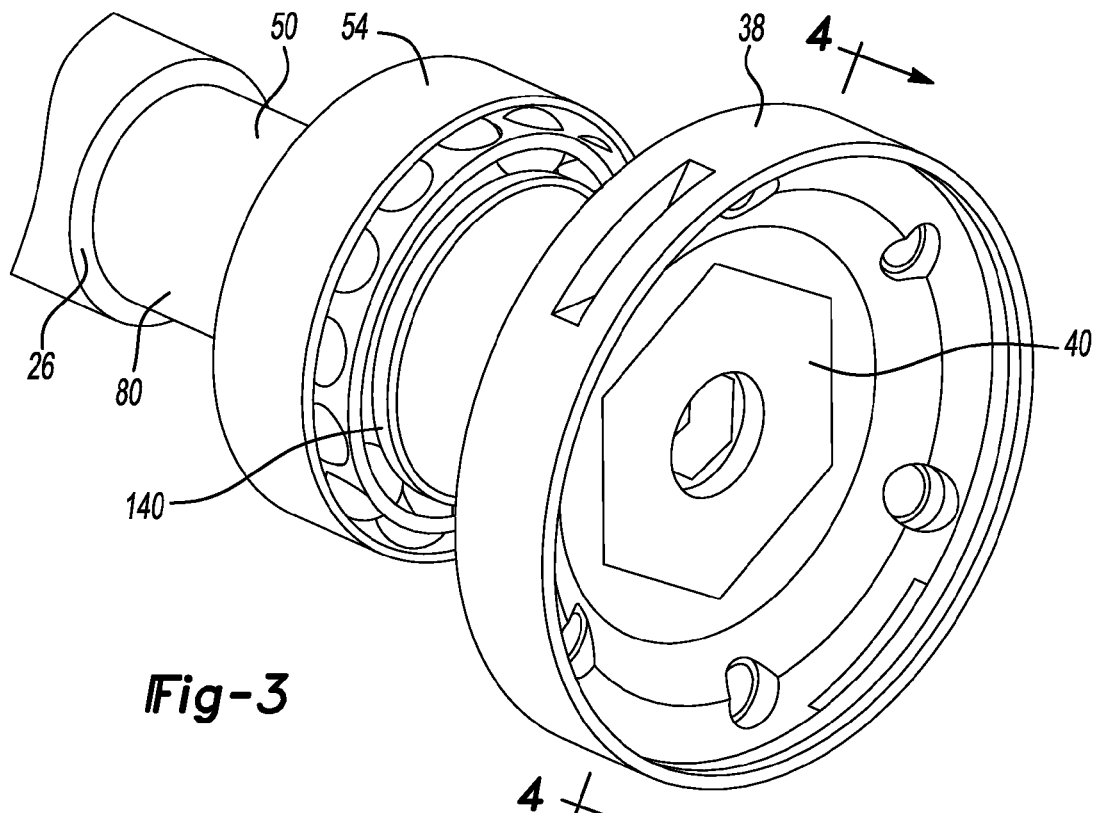
FIG. 3 is a perspective view of a portion of the drive train component, illustrating a flange engaged to a pinion and secured via a retainer.
Figure 4:
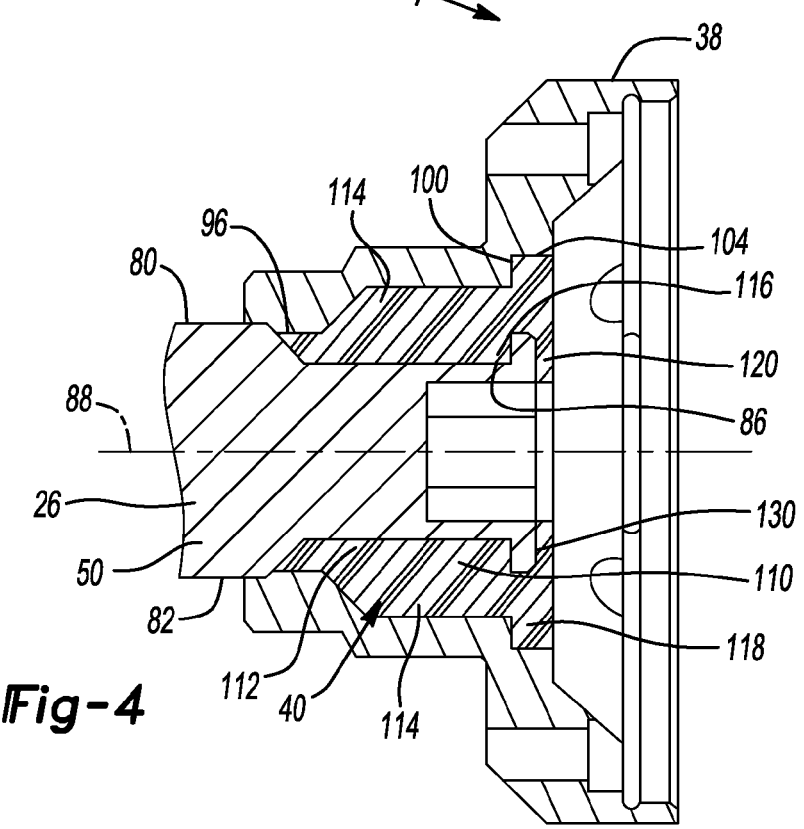
FIG. 4 is a sectional view taken along the line 4-4 of FIG. 3.
Figure 5:
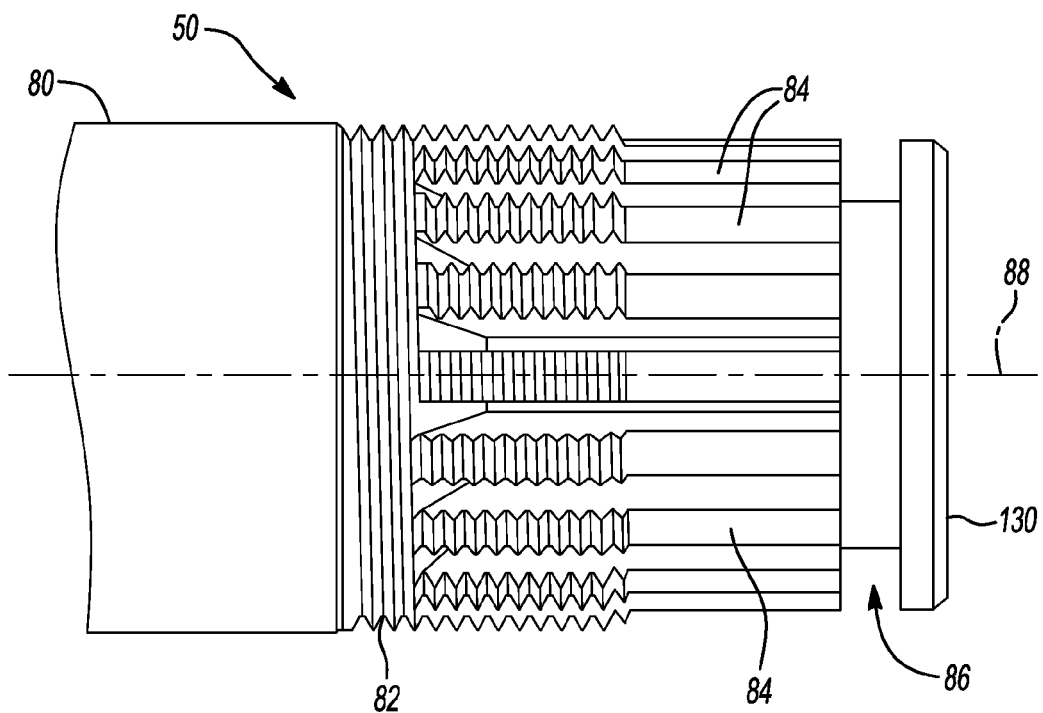
FIG. 5 is a side elevation view of a portion of the pinion.

In FIGS. 3 through 5, the pinion stem 50 can include a bearing mount portion 80, a male threaded segment 82, a plurality of first teeth 84, and an annular channel 86. The tail bearing 54 can be mounted on the bearing mount portion 80. The first teeth 84 can be spline teeth that can extend parallel to a rotational axis 88 of the pinion 26. The first teeth can be spaced circumferentially apart around the pinion stem 50. The annular channel 86 can be formed into the pinion stem 50 at a desired location, such as toward an end of the pinion stem 50, and can intersect the first teeth 84.

Figure 6:
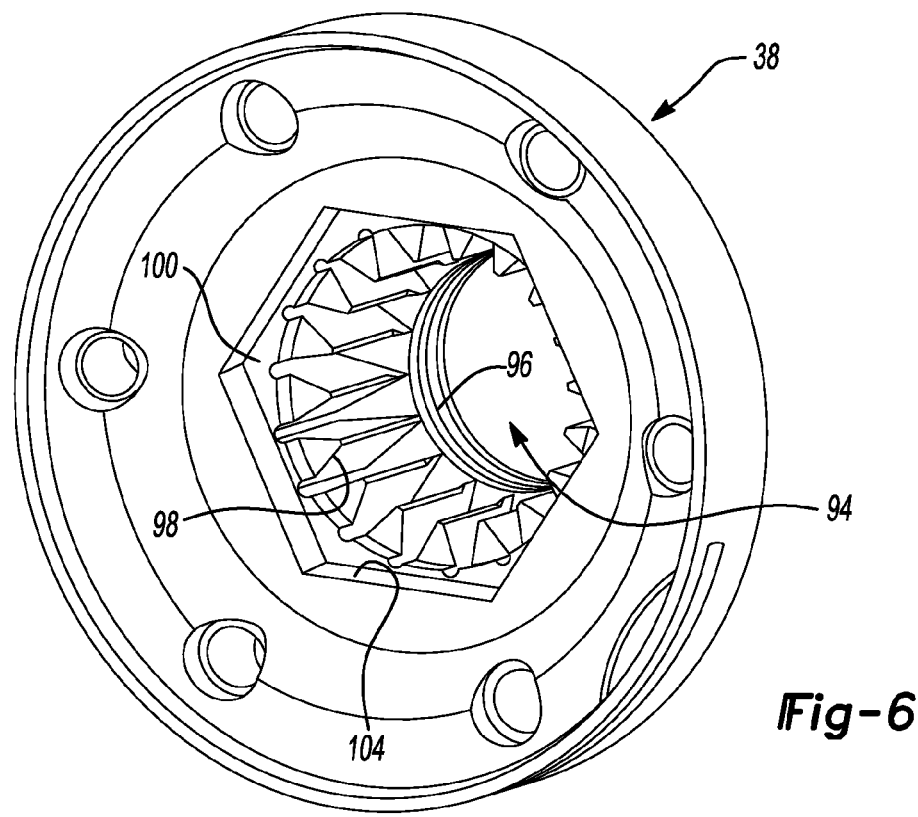
FIG. 6 is a perspective view of the flange.

With reference to FIGS. 3, 4 and 6, the flange 38 can be fixedly coupled to the pinion 26 and can be removably coupled to the propeller shaft 20 (FIG. 2). The flange 38 can have an internal aperture 94 that can define a female threaded segment 96, a plurality of second teeth 98 and a shoulder 100. The female threaded segment 96 can be threadably engaged to the male threaded segment 82 on the pinion stem 50. The second teeth 98 can be spaced circumferentially apart around the interior of the internal aperture 94 and are not configured to engage the first teeth 84 (FIG. 5). The shoulder 100 can be formed as a step between a tool engaging portion 104 of the internal aperture 94 and the portion of the internal aperture 94 that defines the second teeth 98. The tool engaging portion 104 can have a non-circular shape that is adapted to be engaged by a tool that is used to tighten the flange 38 onto the pinion stem 50. In the particular example provided, the non-circular shape of the tool engaging portion 104 is hexagonal.

Figure 7:
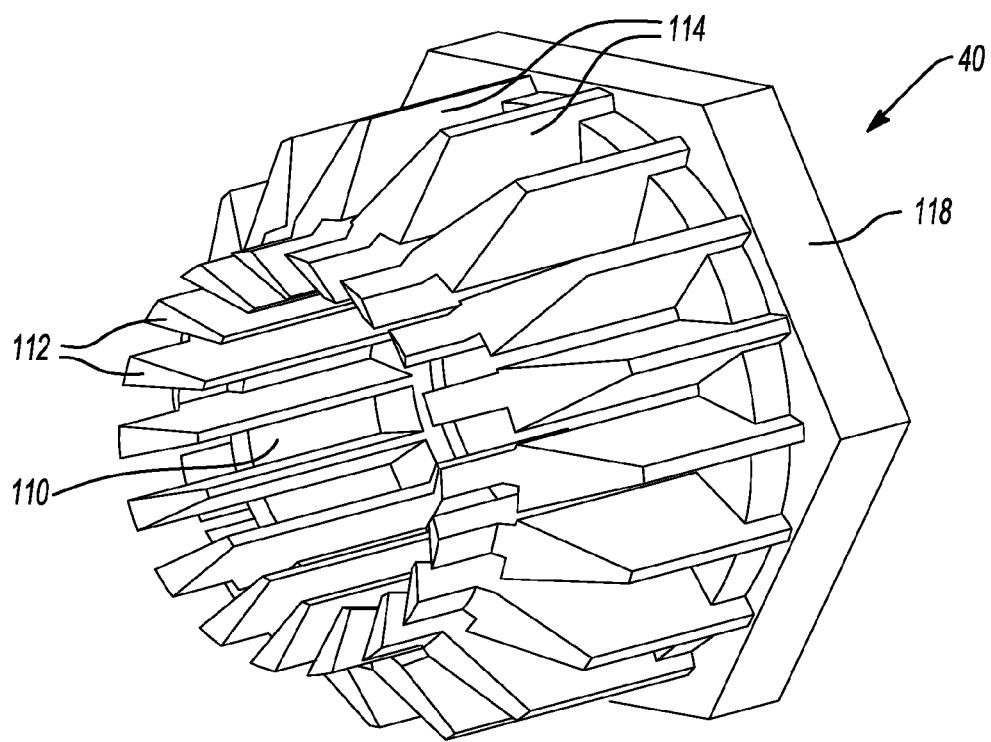
FIG. 7 is a perspective view of the retainer.
Figure 8:
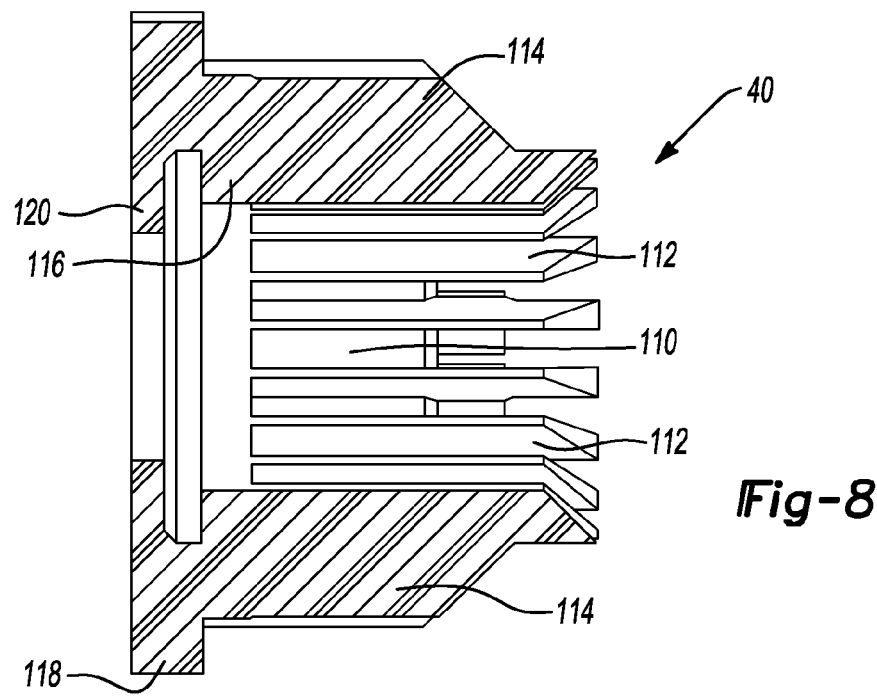
FIG. 8 is a section view taken along the line 8-8 of FIG. 7.

With reference to FIGS. 4, 7 and 8, the retainer 40 can be formed of a plastic material, and can be inserted between the pinion stem 50 and the flange 38 in any desired manner, such as insert molding. The plastic material can be any appropriate material, such as a polyamide (e.g., nylon), and can be reinforced as desired with a suitable material, such as glass fibers. One exemplary material is an ULTRAMID® A3WG6 BK material that is marketed by BASF of Wyandotte, Mich. The retainer 40 can include a retainer body 110, a plurality of third teeth 112, a plurality of fourth teeth 114, a first axial retaining member 116, a second axial retaining member 118 and a third axial retaining member 120. The retainer body 110 can be an annular structure that can be disposed about the pinion stem 50. The third teeth 112 can extend radially from the retainer body 110 and can be matingly engaged with the first teeth 84 on the pinion stem 50. The fourth teeth 114 can extend radially from the retainer body 110 and can be matingly engaged with the second teeth 98 on the flange 38. The first axial retaining member 116 can extend from the retainer body 110 and can be received into the annular channel 86 to thereby inhibit axial movement of the retainer 40 relative to the pinion stem 50 along the rotational axis 88 of the pinion stem 50. The second axial retaining member 118 can extend from the retainer body 110 into the tool engaging portion 104 of the internal aperture 94 and can abut the shoulder 100. The third axial retaining member 120 can extend from the retainer body 110 over an axial end 130 of the pinion stem 50 (i.e., the axial end 130 of the pinion stem 50 can be encapsulated into the retainer 40). It will be appreciated that the first, second and third axial retaining members 116, 118 and 120 serve redundant functions and as such, one or two of the first, second and third axial retaining members 116, 118 and 120 could be omitted.

It will be appreciated that the retainer 40 non-rotatably locks the flange 38 to the pinion stem 50 and is configured to carry all load that is transmitted between the flange 38 and the pinion 26. Moreover, the retainer 40 can form a seal between the pinion stem 50 and the flange 38.

With reference to FIGS. 3 and 4, it will also be appreciated that as the flange 38 is threaded to the pinion stem 50, the flange 38 could be employed to preload the tail bearing 54. In this regard, the flange 38 can be abutted against a bearing race, such as an inner bearing race 140, of the tail bearing 54 and can cooperate with the pinion stem 50 to produce a clamping force that is transmitted to the tail bearing 54 to pre-load the tail bearing 54.

An exemplary method for coupling the flange 38 to the pinion stem 50 can include: threading the flange 38 to the pinion stem 50; and injecting a plastic material between the flange 38 and the pinion stem 50, the plastic material hardening to form a retainer 40 that inhibits rotation of the flange 38 relative to the pinion stem 50, the retainer 40 being configured to carry all load that is transmitted between the flange 38 and the pinion 26. It will be appreciated that threading the flange 38 to the pinion stem 50 can include developing a clamping force to axially preload a bearing (e.g., the tail bearing 54) that supports the pinion stem 50 for rotation relative to the housing 32.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transmitting component comprising:
   a housing;
   a pinion rotatably disposed in the housing and having a pinion stem, the pinion stem defining a male threaded segment and a plurality of first teeth, the plurality of first teeth intersecting the male threaded segment;
   a flange having an internal aperture that defines a female threaded segment, a plurality of second teeth, the female threaded segment being threadably engaged with the male threaded segment;
   a retainer that is insert molded between the pinion stem and the flange, the retainer comprising a retainer body, a plurality of third teeth, a plurality of fourth teeth and a first axial retaining member, the third teeth extending from the retainer body and engaging the first teeth, the fourth teeth extending from the retainer body and engaging the second teeth, the first axial retaining member being engaged to one of the flange and the pinion stem.

2. The power transmitting component of claim 1, wherein the retainer is formed of a reinforced plastic material.

3. The power transmitting component of claim 2, wherein the plastic material is reinforced with glass.

4. The power transmitting component of claim 1, wherein the retainer forms a seal between the flange and the pinion stem.

5. The power transmitting component of claim 1, further comprising a bearing supporting the pinion stem for rotation relative to the housing, the bearing being an angular contact bearing and/or a tapered roller bearing and wherein the flange is abutted against a bearing race of the bearing.

6. The power transmitting component of claim 1, wherein the retainer further comprises a second axial retaining member that is abutted against the other one of the flange and the pinion stem.

7. The power transmitting component of claim 6, wherein the retainer further comprises a third axial retaining member that is abutted against the pinion stem.

8. The power transmitting component of claim 6, wherein the internal aperture in the flange further defines a shoulder and wherein one of the first and second axial retaining members abuts the shoulder.

9. The power transmitting component of claim 8, wherein a portion of the internal aperture that receives the one of the first and second axial retaining members has a non-circular shape that is adapted to receive a tool that is used to tighten the flange on the pinion stem.

10. The power transmitting component of claim 9, wherein the non-circular shape is hexagonal.

11. The power transmitting component of claim 1, wherein the internal aperture in the flange further defines a shoulder and wherein the first axial member abuts the shoulder.

12. The power transmitting component of claim 11, wherein the portion of the internal aperture that receives the first axial retaining member has a non-circular shape that is adapted to receive a tool that is used to tighten the flange on the pinion stem.

13. The power transmitting component of claim 12, wherein the non-circular shape is hexagonal.

14. The power transmitting component of claim 1, wherein the pinion stem defines an annular channel and wherein the first axial retaining member is received into the annular channel.

15. The power transmitting component of claim 14, wherein the annular channel intersects the plurality of first teeth.

* * * * *